US010087833B2

(12) United States Patent
Tanabe et al.

(10) Patent No.: US 10,087,833 B2
(45) Date of Patent: Oct. 2, 2018

(54) DOUBLE-LINK PISTON CRANK MECHANISM FOR INTERNAL COMBUSTION ENGINE

(71) Applicant: NISSAN MOTOR CO., LTD., Kanagawa (JP)

(72) Inventors: Takashi Tanabe, Kanagawa (JP); Katsuya Moteki, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/543,662

(22) PCT Filed: Jan. 15, 2015

(86) PCT No.: PCT/JP2015/050873
§ 371 (c)(1),
(2) Date: Jul. 14, 2017

(87) PCT Pub. No.: WO2016/113872
PCT Pub. Date: Jul. 21, 2016

(65) Prior Publication Data
US 2018/0023467 A1    Jan. 25, 2018

(51) Int. Cl.
*F02B 75/04* (2006.01)
*F01M 1/06* (2006.01)
(Continued)

(52) U.S. Cl.
CPC ............. *F02B 75/045* (2013.01); *F01M 1/06* (2013.01); *F02B 75/32* (2013.01); *F16C 3/14* (2013.01);
(Continued)

(58) Field of Classification Search
CPC ...... F02B 75/045; F02B 75/04; F02B 75/048; F02B 75/32; F01M 1/06; F16C 3/14; F16C 3/30; F16C 11/02
See application file for complete search history.

(56) References Cited

U.S. PATENT DOCUMENTS

2007/0137608 A1* 6/2007 Mizuno ................... F02B 75/32
123/197.4
2009/0095261 A1* 4/2009 Kono ..................... F02B 75/045
123/48 B
(Continued)

FOREIGN PATENT DOCUMENTS

DE    102011104531 A1    12/2012
EP    1505277 A1    2/2005
(Continued)

OTHER PUBLICATIONS

International Preliminary Report on Patentability issued in corresponding PCT/JP2015/050873, dated Jul. 27, 2017 (11 pages).

*Primary Examiner* — Jacob Amick
(74) *Attorney, Agent, or Firm* — Osha Liang LLP (57) ABSTRACT

A multi-link piston crank mechanism includes a crank pin bearing portion including a crank pin bearing central portion that is disposed at a center thereof in an axial direction of a crank shaft. The crank pin bearing central portion at a portion positioned on the first end side of the lower link is thicker in a radial direction of the crank pin than a portion positioned on the second end side of the lower link. The second control link end portion is thicker along a radial direction of the second through hole than the second upper link end portion along a radial direction of the first through hole.

8 Claims, 8 Drawing Sheets

(51) Int. Cl.
 *F02B 75/32* (2006.01)
 *F16C 3/30* (2006.01)
 *F16C 11/02* (2006.01)
 *F16C 3/14* (2006.01)
 *F01M 1/02* (2006.01)

(52) U.S. Cl.
 CPC ............... *F16C 3/30* (2013.01); *F16C 11/02* (2013.01); *F01M 1/02* (2013.01); *F01M 2001/062* (2013.01)

(56) References Cited

U.S. PATENT DOCUMENTS

| | | | |
|---|---|---|---|
| 2009/0107468 A1* | 4/2009 | Takahashi | F02B 75/048 123/48 B |
| 2014/0137825 A1* | 5/2014 | Brendel | F16F 15/264 123/90.17 |

FOREIGN PATENT DOCUMENTS

| | | |
|---|---|---|
| EP | 2048335 A1 | 4/2009 |
| EP | 2053217 A2 | 4/2009 |
| JP | 2004-124776 A | 4/2004 |
| JP | 2009-092037 A | 4/2009 |
| JP | 2009-108707 A | 5/2009 |
| JP | 2009-215970 A | 9/2009 |
| WO | 2011/007622 A1 | 1/2011 |

* cited by examiner

DOUBLE-LINK PISTON CRANK MECHANISM FOR INTERNAL COMBUSTION ENGINE

BACKGROUND

Technical Field

This invention relates to a multi-link piston crank mechanism of an internal combustion engine.

Related Art

Conventionally, there is known a multi-link piston crank mechanism in which a piston and a crank pin of a crank shaft are linked through a plurality of links.

For example, a patent document 1 discloses a piston crank mechanism for an internal combustion engine which includes an upper link including one end connected through a piston pin to the piston, a lower link connected through an upper pin to the other end of the upper link, and rotatably connected to the crank pin of the crank shaft at the crank pin bearing portion, and a control link including one end swingably supported by the engine main body, and the other end connected through a control pin to the lower link.

The lower link in this patent document 1 includes an upper pin boss portion and a control pin boss portion which are located on the both sides of the crank pin bearing portion. The upper pin boss portion has a bifurcated shape. The upper pin boss portion is a connection portion with the upper link. The control pin boss portion has a bifurcated shape. The control pin boss portion is a connection portion with the control link. Accordingly, in the crank pin bearing portion, rigidities of portions on both sides of a central portion in the crank shaft axial direction which is a crotch of the bifurcated shape are relatively higher than the rigidity of the central portion.

However, in the thus-constructed crank bearing portion, the shape variation amount (deformation amount) of the inner circumference surface of the central portion in the crank shaft axial direction which has a relatively low rigidity becomes larger than the shape variation amount (deformation amount) of the inner circumference surfaces of the both end portions in the crank shaft axial direction which has a relatively low rigidity, at the lubrication of the elastic fluid.

Accordingly, in this lubrication of the elastic fluid, in particular, when the combustion load by which the input load to the lower link becomes maximum is generated, the both end portions of the crank pin bearing portion in the crank shaft axial direction are easy to be contacted on the crank pin at the input position of the input load due to the combustion load. Consequently, the seizure resistance and the abrasion resistance of the crank pin bearing portion may be deteriorated.

Patent Document 1: Japanese Patent Application Publication No. 2009-215970

SUMMARY

In one or more embodiments of the present invention, there are provided: a lower link including a crank pin bearing portion which is rotatably mounted to a crank pin of a crank shaft; an upper link including one end portion connected to a piston pin of a piston, and the other end portion connected to one end side of the lower link through a first link pin inserted into a first through hole of the other end portion of the upper link; and a control link including one end portion supported by a cylinder block, and the other end portion connected to the other end side of the lower link through a second link pin inserted into a second through hole of the other end portion of the control link; the lower link including the one end side to which an input load due to a combustion load is acted, the lower link including a bifurcated one end side protruding piece portion and a bifurcated other end side protruding piece portion which are positioned on both sides of the crank pin bearing portion when viewed from an axial direction of the crank shaft, the bifurcated one end side protruding piece portion sandwiching the other end of the upper link, and the bifurcated other end side protruding piece portion sandwiching the other end of the control link, the crank pin bearing portion including a central portion in the axial direction of the crank shaft, the central portion having a thickness along a radial direction of the crank pin, the thickness of the central portion at a portion positioned on the one end side of the lower link being larger than a thickness of a portion positioned on the other end side of the lower link, and a thickness of the control link other end portion along a radial direction of the second through hole being larger than a thickness of the upper link other end portion along a radial direction of the first through hole.

In one or more embodiments of the present invention, the portion on the one end side of the lower link in the crank pin bearing portion has the thickness of the central portion in the crank shaft axial direction, which is larger than a thickness positioned on the other end side of the lower link in the crank pin bearing portion, so as to have the relatively high rigidity. Accordingly, the crank pin bearing portion can suppress the shape variation (the deformation) of the central portion in the crank shaft axial direction, on the one end side of the lower link. That is, the crank pin bearing portion relieves the bearing end portion contacts in which the both end portions are contacted on the crank pin, on the one end side of the lower link. Consequently, it is possible to improve the seizure resistance and the abrasion resistance of the crank pin bearing portion.

DETAILED DESCRIPTION

Figure 1:
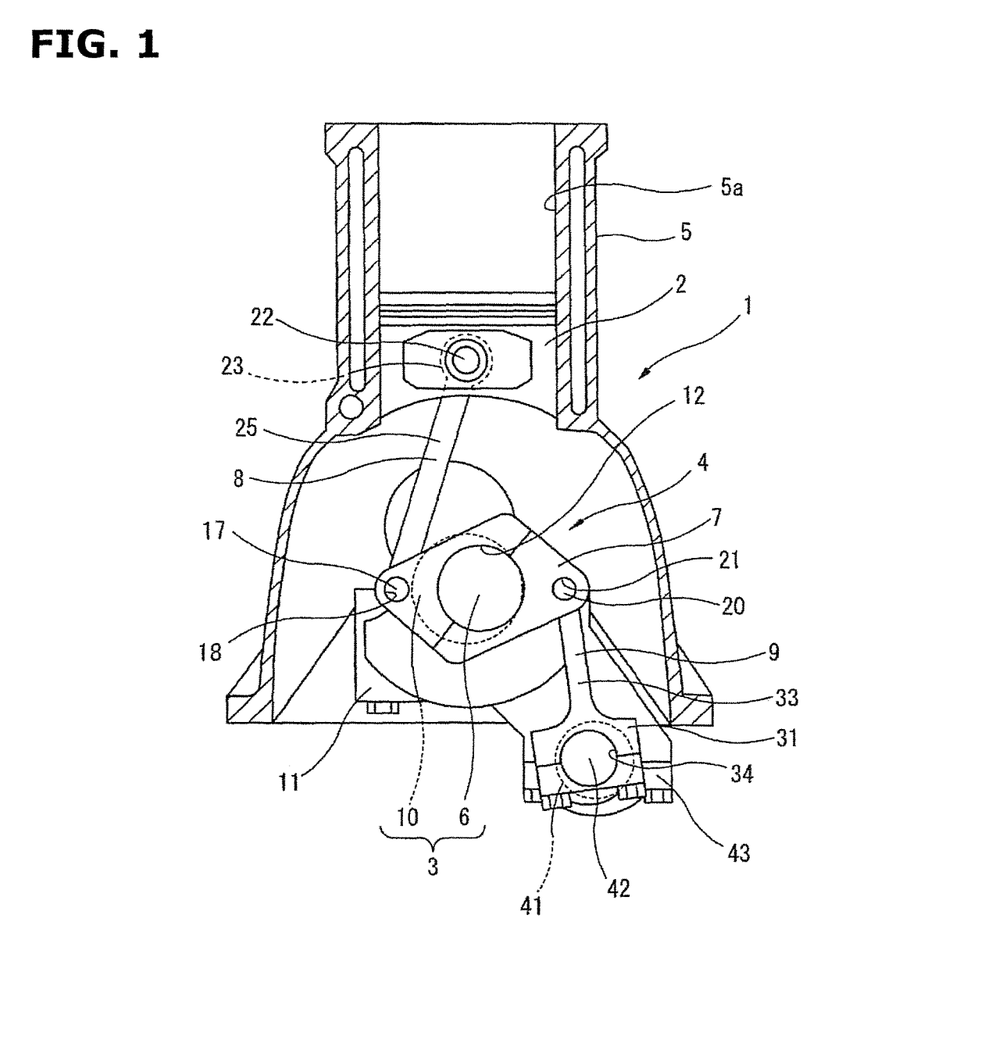
FIG. 1 is an explanatory view schematically showing an internal combustion engine including one or more embodiments the present invention.

Hereinafter, embodiments of the present invention are described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is an explanatory view schematically showing an internal combustion engine 1 including one or more embodiments of the present invention.

An internal combustion engine 1 includes a multi-link piston crank mechanism (double-link piston crank mechanism) 4 by which a piston 2 and a crank shaft 3 are linked with each other by a plurality of links. The multi-link piston crank mechanism 4 in one or more embodiments of the present invention is a variable compression ratio mechanism arranged to vary an upper dead center position of the piston 2 reciprocated within a cylinder 5a of a cylinder block 5, and thereby to vary an engine compression ratio.

The multi-link piston crank mechanism 4 includes a lower link 7 rotatably mounted to a crank pin 6 of a crank shaft 3; an upper link 8 linking the piston 2 and the lower link 7; and a control link 9 including one end rotatably supported by the cylinder block 5, and the other end rotatably connected to the lower link 7.

The crank shaft 3 includes a plurality of journal portions 10 and the crank pin 6. The journal portions 10 are rotatably supported by crank shaft bearing portions (not shown) which are constituted by the cylinder block 5 and a main bearing cap 11. The crank pin 6 is eccentric from the journal portions 10 by a predetermined amount. The lower link 7 is rotatably mounted on the crank pin 6.

Figure 2:
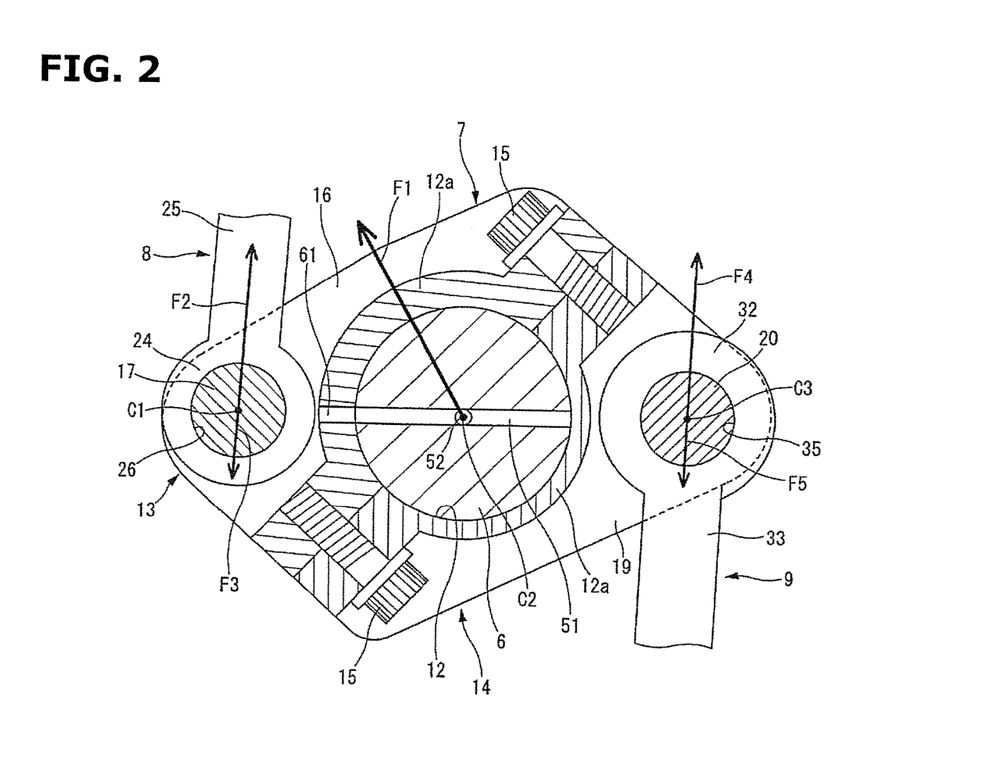
FIG. 2 is an explanatory view schematically showing main parts of a multi-link piston crank mechanism of an internal combustion engine according to one or more embodiments of the present invention.

FIG. 2 is a sectional view at a central (middle) portion of the lower link 7 in the crank shaft axial direction. As shown in FIG. 2, the lower link 7 includes a crank pin bearing portion 12 rotatably mounted on the crank pin 6 of the crank shaft 3; and one end side protruding piece portion 13 and the other end side protruding piece portion 14 which are positioned on the both sides of the crank pin bearing portion 12. The other end side of the upper link 8 is rotatably connected to the one end side protruding piece portion 13. The other end side of the control link 9 is rotatably connected to the other end side protruding piece portion 14. An input load F1 caused due to the combustion load is acted to the one end side of the lower link 7 from the crank pin 6, as shown by an arrow in FIG. 2.

In this case, the one end side of the lower link 7 is a side on which the one end side protruding piece portion 13 of the lower link 7 is formed. Moreover, the other end side of the lower link 7 is a side on which the other end side protruding piece portion 14 of the lower link 7 is formed.

The crank pin bearing portion 12 is a through hole having a circular section. The lower link 7 can be divided into two members at a dividing surface at which the crank pin bearing portion 12 is divided into two portions, for assembling the lower link 7 to the crank pin 6. The lower link 7 is integrated by two bolts 15 and 15.

The one end side protruding piece portion 13 has a bifurcated shape which sandwiches the other end side of the upper link 8. This one end side protruding piece portion 13 includes a pair of one end side protruding pieces 16 confronting each other. Each of the one end protruding pieces 16 includes a lower link one end side pin hole 18 in which a substantially cylindrical first link pin 17 is fixed by the press fit.

The other end side protruding piece portion 14 has a bifurcated shape which sandwiches the other end side of the control link 9. The other end side protruding piece portion 14 includes a pair of the other end side protruding pieces 19 confronting each other. Each of the other end side protruding piece portions 19 includes a lower link other end side pin hole 21 in which a substantially cylindrical second link pin 20 is fixed by the press fit.

The upper link 8 includes an upper link one end portion 23 rotatably mounted to the piston 2 by a piston pin 22; an upper link other end portion 24 rotatably connected to the one end side protruding piece portion 13 of the lower link 7 by the first link pin 17; and an upper link rod portion 25 connecting the upper link one end portion 23 and the upper link other end portion 24.

The upper link one end portion 23 includes an upper link one end side pin hole (not shown) which is formed at a central portion of the upper link one end portion 23 to penetrate through the upper link one end portion 23, and into which the piston pin 22 is rotatably inserted.

The upper link other end portion 24 includes an upper link other end side pin hole 26 that is a first through hole which is formed at a central portion of the upper link other end portion 24 to penetrate through the upper link other end portion 24, and into which the first link pin 17 is rotatably inserted.

The control link 9 is arranged to restrict a movement of the lower link 7. The control link 9 includes a control link one end portion 31 rotatably connected to an eccentric shaft portion 42 of a control shaft 41; a control link other end portion 32 rotatably connected to the other end side protruding piece portion 14 of the lower link 7 by the second link pin 20; and a control link rod portion 33 connecting the control link one end portion 31 and the control link other end portion 32.

The control link one end portion 31 includes a control link one end side pin hole 34 formed at a central portion of the control link one end portion 31 to penetrate through the control link one end portion 31, and into which the eccentric shaft portion 42 is rotatably inserted.

The control link other end portion 32 includes a control link other end side pin hole 35 that is a second through hole which is formed at a central portion of the control link other end portion 32 to penetrate through the control link other end portion 32, and into which the second link pin 20 is rotatably inserted.

The control shaft 41 is disposed on a lower side of the crank shaft 3 in parallel with the crank shaft 3. The control shaft 41 is rotatably supported on the control shaft bearing portion (not shown) constituted by the main bearing cap 11 and a control shaft bearing cap 43. That is, the control shaft 41 is rotatably supported by the cylinder block 5 which is a part of the engine main body.

The control shaft 41 is driven and rotated by an actuator (not shown), so that a rotation position of the control shaft 41 is controlled. The actuator may be, for example, an electric motor, or a hydraulically driven actuator.

The multi-link piston crank mechanism 4 according to one or more embodiments of the present invention is constituted so that a center C1 of the first link pin 17, a center C2 of the crank pin 6, and a center C3 of the second link pin 20 are aligned in the same line when viewed from the crank shaft axial direction.

A crank pin oil passage 51 is formed in the crank pin 6. The crank pin oil passage 51 passes through the center of the crank pin when viewed from the crank shaft axial direction. The crank pin oil passage 51 extends radially within the crank pin 6 in the linear shape. In one or more embodiments of the present invention, both ends of the crank pin oil passage 51 are opened, respectively, on an outer circumference surface of the crank pin 6. A lubricant pressurized by an oil pump (not shown) is supplied to this crank pin oil passage 51 through an axial oil passage 52 extending in the crank shaft axial direction.

Figure 3:
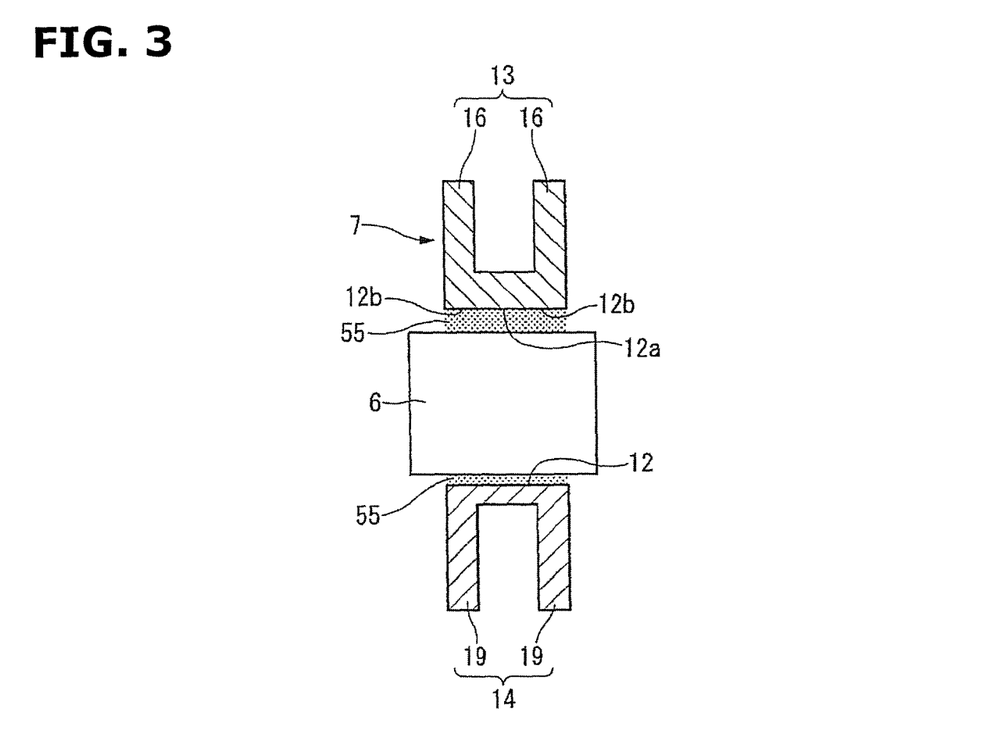
FIG. 3 is an explanatory view schematically showing main parts of a lower link.

In this lower link 7 of the multi-link piston crank mechanism 4, the one end side protruding piece portion 13 having the bifurcated shape, and the other end side protruding piece portion 14 having the bifurcated shape are integrally provided on the outer circumference side of the crank pin bearing portion 12. That is, as shown in FIG. 3, the one end side protruding pieces 16 of the one end side protruding piece portion 13, or the other end side protruding pieces 19 of the other end side protruding piece portion 14 are connected to an outer circumference side of both end portions 12b of the crank pin bearing portion 12 along the crank shaft axial direction.

Accordingly, in the crank pin bearing portion 12, the rigidities of the both side portions 12b of the crank pin bearing portion 12 in the crank shaft axial direction are relatively higher than that of a central portion (middle portion) 12a of the crank pin bearing portion 12 in the crank shaft axial direction, which is a crotch portion (fork portion). Reference symbol 55 in FIG. 3 is a lubricant oil to lubricate a portion between the crank pin bearing portion 12 and the crank pin 6.

Figure 4:
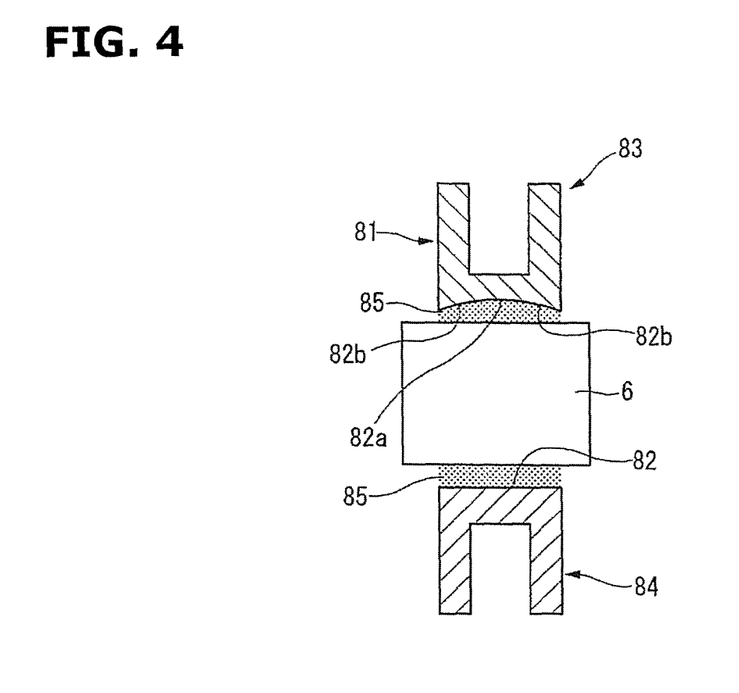
FIG. 4 is an explanatory view schematically showing a lower link in a comparative example.

In a lower link 81 of a comparative example in which bifurcated one end side protruding piece portion 83 and bifurcated other end side protruding piece portion 84 are integrally provided on the outer circumference side of a crank pin bearing portion 82, like the lower link 7 in one or more embodiments of the present invention, the rigidities of both side portions 82b of the crank pin bearing portion 82 in the crank shaft axial direction is relatively higher than that of a central portion 82a of the crank pin bearing portion 82 in the crank shaft axial direction, as shown in FIG. 4. Reference symbol 85 in FIG. 4 is a lubricant oil to lubricate a portion between the crank pin bearing portion 82 and the crank pin 6.

Accordingly, a shape variation amount (deformation amount) of an inner circumference surface of the central portion 82a of the crank pin bearing portion 82 in the crank shaft axial direction, which has the relatively lower rigidity becomes larger than those of inner circumference surfaces of the both end portions 82b of the crank pin bearing portion 82 in the crank shaft axial direction, which has the relatively higher rigidity, at the lubrication of the elastic fluid.

That is, at the lubrication of the elastic fluid, in particular, when the combustion load by which the input load to the lower link 81 becomes maximum is generated, the both end portions 82b of the crank pin bearing portion 82 in the crank shaft axial direction are easy to be contacted on the crank pin 6, at the input position of the input load caused due to the combustion load. Consequently, the seizure resistance and the abrasion resistance of the crank pin bearing portion 82 may be deteriorated.

Accordingly, the lower link 7 according to one or more embodiments of the present invention is formed so that a thickness (crank pin radial direction thickness) of the central portion 12a of the crank pin bearing portion 12 in the crank shaft axial direction along the crank pin radial direction becomes relatively larger on the one end side of the lower link 7, as shown in FIG. 2 and FIG. 3. That is, in the thickness of the central portion 12a of the crank pin bearing portion 12 in the crank shaft axial direction along the crank pin radial direction, a portion which is located on the one end side of the lower link 7, and to which the input load F1 due to the combustion load is acted is larger than the portion which is located on the other end side of the lower link 7.

Therefore, it is possible to suppress the deformation at the central portion of the crank pin bearing portion 12 in the crank shaft axial direction, on the one end side of the lower link 7 to which the input load F1 due to the combustion load is acted. That is, it is possible to relieve the bearing end portion contacts (abutments) in which the both end portions 12b of the crank pin bearing portion 12 in the crank shaft axial direction are contacted on the crank pin 6, on the one end side of the lower link 7. Consequently, it is possible to improve the seizure resistance and the abrasion resistance of the crank pin bearing portion 12.

In one or more embodiments of the present invention, the thicknesses of the central portion 12a of the crank pin bearing portion 12 in the crank shaft axial direction along the crank pin radial direction are constant, respectively, on the one end side and the other end side of the lower link 7, along the circumferential direction of the crank pin bearing portion.

The crank pin bearing portion 12 includes an oil hole 61 which is formed in the central portion 12a in the crank shaft axial direction, at the portion that is located on the one end side of the lower link 7, and that has a relatively larger thickness along the crank pin radial direction, and which penetrates through the central portion 12a. The oil hole 61 is arranged to supply the lubricant oil from the crank pin side to the upper link other end portion 24.

The oil hole 61 is formed to be out of the input position of the input load F1 which is acted to the lower link 7 due to the combustion load, and to be out of the position on the line of the action of the input load F1. In one or more embodiments of the present invention, the oil hole 61 is formed on the linear line passing through the center C1 of the first link pin 17, the center C2 of the crank pin 6, and the center C3 of the second link pin 20 when viewed from the crank shaft axial direction.

In this way, the oil hole 61 is formed at the position which is on the one side of the lower link 7, and which has the relatively larger thickness along the crank pin radial direction. With this, it is possible to suppress the reduction of the strength of the crank pin bearing portion 12, and to supply the lubricant oil from the crank pin side to the upper link other end portion 24. It is possible to improve the seizure resistance and the abrasion resistance of the lower link one end side pin hole 18 of the upper link other end portion 24 which is the bearing portion of the first link pin 17.

Moreover, the oil hole 61 is formed to be out of (off) the input position of the input load F1 which is acted to the lower link 7 due to the combustion load, and to be out of the position on the line of the action of the input load F1. Accordingly, it is possible to decrease the stress (the tension) generated in the oil hole 61, and to improve the fatigue strength of the portion around the oil hole 61. Moreover, it is possible to suppress the fatigue of the sliding surface of the portion around the upstream opening of the oil hole 61 opened on the inner circumference surface of the crank pin bearing portion 12, in accordance with the improvement of the fatigue strength of the portion around the oil hole 61. It is possible to improve the seizure resistance and the abrasion resistance of the crank pin bearing portion 12.

Furthermore, the oil hole 61 is formed on the linear line passing through the center C1 of the first link pin 17, the center C2 of the crank pin 6, and the center C3 of the second link pin 20 when viewed from the crank shaft axial direction. Accordingly, it is possible to effectively supply the lubricant oil to the sliding surface of the upper link other end portion 24.

Moreover, the forming position of the oil hole 61 needs not be necessarily formed to be out of the position of the input load F1 which is acted to the lower link 7 due to the combustion load, and to be out of the position on the line of the action of the input load F1 as long as the forming position corresponds to the portion which is located on the one end side of the lower link 7, which has the relatively larger thickness along the crank pin radial direction, in the central portion 12*a* of the crank pin bearing portion 12 in the crank shaft axial direction. Furthermore, the forming position of the oil hole 61 needs not be positioned on the linear line passing through the center C1 of the first link pin 17, the center C2 of the crank pin 6, and the center C3 of the second link pin 20 when viewed from the crank shaft axial direction.

Figure 5:
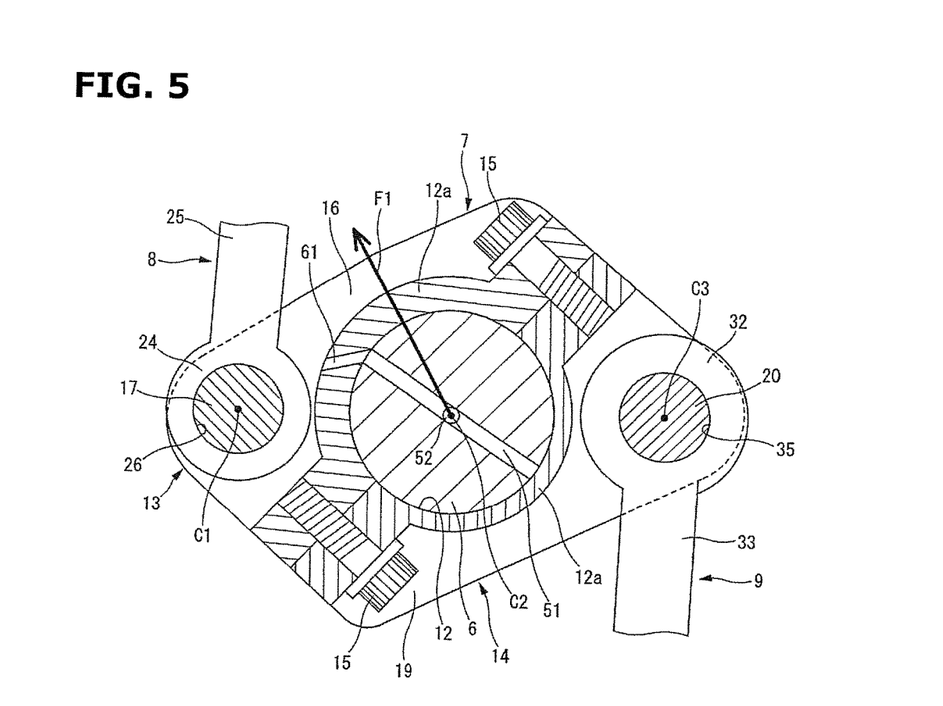
FIG. 5 is an explanatory view showing a multi-link piston crank mechanism of the internal combustion engine according to one or more embodiments of the present invention.

That is, for example, as shown in FIG. 5, the oil hole 61 may be formed to be out of the input position of the input load F1 which is acted to the lower link 7 due to the combustion load, and to be out of the line of the action of the input load F1, at the portion which is located on the one end side of the lower link 7, and which has the relatively larger thickness along the crank pin radial direction, in the central portion 12*a* of the crank pin bearing portion 12 in the crank shaft axial direction.

Moreover, the thickness of the control link other end portion 32 along the control link other end side pin hole radial direction (hereinafter, referred to as a second through hole radial direction) is formed to be larger than the thickness of the upper link other end portion 24 along the upper link other end side pin hole radial direction (hereinafter, referred to as a first through hole radial direction).

The input load F2 in the compression direction due to the combustion load, and the input load F3 which is in the pulling direction due to the inertia load smaller than the combustion load are acted from the first link pin 17 to the upper link other end portion 24. Accordingly, the input load F2 inputted to the upper link other end portion 24 due to the combustion load is supported by the upper link other end portion 24 and the upper link rod portion 25. The input load F2 is greater than the input load F3.

The input load F4 in the pulling direction due to the combustion load due to the combustion load, and the input load F5 in the compression direction due to the inertial load smaller than the combustion load are acted from the second link pin 20 to the control link other end portion 32. Accordingly, the input load F4 inputted to the control link other end portion 32 due to the combustion load is supported by the control link other end portion 32. The input load F4 is greater than the input load F5.

That is, the upper link other end portion 24 can support the large input load F2 due to the combustion load, with the upper link rod portion 25. Accordingly, even when the thickness of the upper link other end portion 24 along the first through hole radial direction is formed to be smaller than the thickness of the control link other end portion 32 along the second through hole radial direction, it is possible to ensure the necessary rigidity.

Accordingly, even when the thickness of the central portion 12*a* of the crank pin bearing portion 12 in the crank shaft axial direction along the crank pin radial direction is formed to be large on the one end side of the lower link 7 for ensuring the rigidity of the central portion 12*a* of the crank pin bearing portion 12 in the crank shaft axial direction, it is possible to avoid the interference with the upper link other end portion 24 by decreasing the thickness of the upper link other end portion 24 along the first through hole radial direction by the increasing amount of the thickness of the central portion 12*a*.

Furthermore, the thickness of the central portion 12*a* of the crank pin bearing portion 12 in the crank shaft axial direction along the crank pin radial direction is not be relatively larger on the other end side of the lower link 7. Accordingly, it is not necessary to decrease the thickness of the control link other end portion 32 along the second through hole radial direction. It is possible to ensure the rigidity of the control link other end portion 32 while avoiding the interference with the lower link 7.

Figure 6:
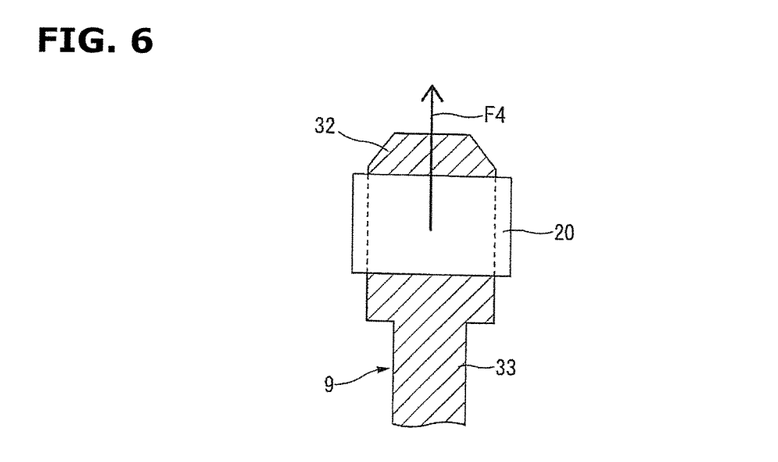
FIG. 6 is an explanatory view schematically showing main parts of the multi-link piston crank mechanism of the internal combustion engine according to one or more embodiments of the present invention.

In the control link other end portion 32, as shown in FIG. 6, the thicknesses (second through hole radial direction thicknesses) of the both end portions of the control link other end portion 32 in the control link other end side pin hole axial direction (hereinafter, referred to as a second through hole axial direction) along the second through hole radial direction is formed to be smaller than the thickness (the second through hole radial direction thickness) of the central portion in the second through hole axial direction along the second through hole radial direction, on the side on which the input load F4 is acted due to the combustion load.

That is, the both end portions of the control link other end portion 32 in the second through hole axial direction are formed so that the thickness along the second through hole radial direction is formed to be smaller toward the both sides in the second through hole axial direction.

With this, in the control link other end portion 32, the central portion in the second through hole axial direction has the rigidity higher than those of the both end portions in the second through hole axial direction, on the side on which the input load F4 is acted due to the combustion load.

Figure 7:
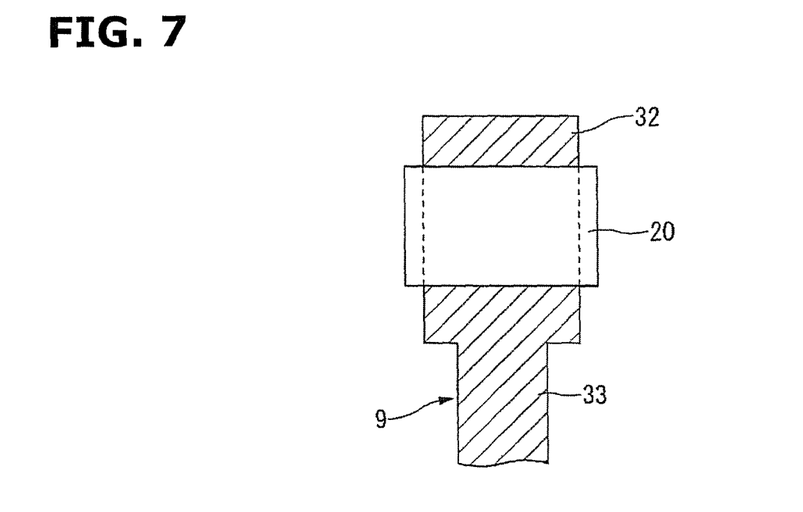
FIG. 7 is an explanatory view schematically showing an upper link other end portion in a comparative example.
Figure 8:
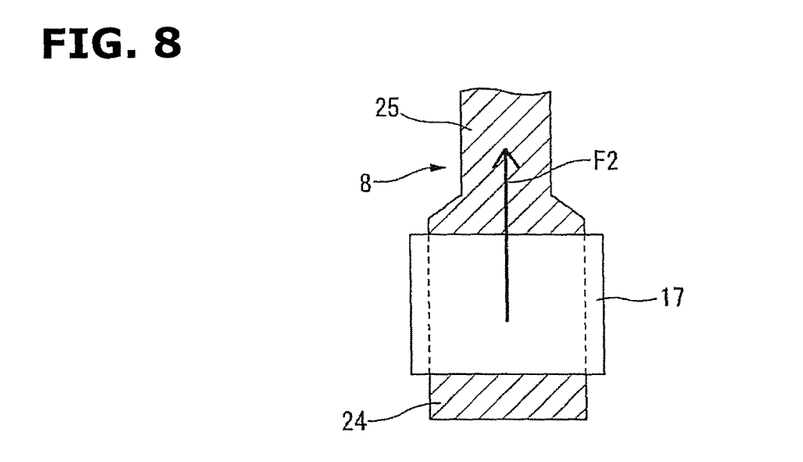
FIG. 8 is an explanatory view schematically showing main parts of the multi-link piston crank mechanism of the internal combustion engine according to one or more embodiments of the present invention.

Accordingly, when the input load F4 is acted, in the control link other end portion 32, the shape variation (deformation) of the central portion of the control link other end portion 32 in the second through hole axial direction is relatively suppressed on the side on which the input load F4 is acted due to the combustion load. That is, it is possible to relieve the bearing end portion contacts at which the both end portions in the second through hole axial direction are contacted on the second link pin 20, relative to a case where the thickness along the second through hole radial direction is constant along the second through hole axial direction (cf. FIG. 7) on the side on which the input load F4 is acted in the control link other end portion 32. Consequently, it is possible to improve the seizure resistance and the abrasion resistance of the control link other end side pin hole 35.

In the control link other end portion 32, the thickness along the second through hole radial direction is relatively larger to increase the strength. Accordingly, it is possible to ensure the necessary strength even when the thicknesses of the both end portions in the second through hole axial direction are formed to be smaller.

In the upper link other end portion 24, as shown in FIG. 6, the thicknesses (the first through hole radial direction thicknesses) of the both end portions in the upper link other end side pin hole axial direction (hereinafter, referred to as the first through hole axial direction) along the first through hole radial direction are formed to be smaller than the thickness (the first through hole radial direction thickness) of the central portion in the first through hole axial direction along the first through hole radial direction, on the side on which the input load F4 is acted due to the combustion load.

That is, the both end portions of the upper link other end portion 24 in the first through hole axial direction are formed so that the thickness along the first through hole radial direction is smaller towards the both sides in the first through hole axial direction.

With this, in the upper link other end portion 24, the central portion in the first through hole axial direction has the rigidity higher than those of the both end portions in the first through hole axial direction, on the side on which the input load F2 is acted due to the combustion load.

Figure 9:
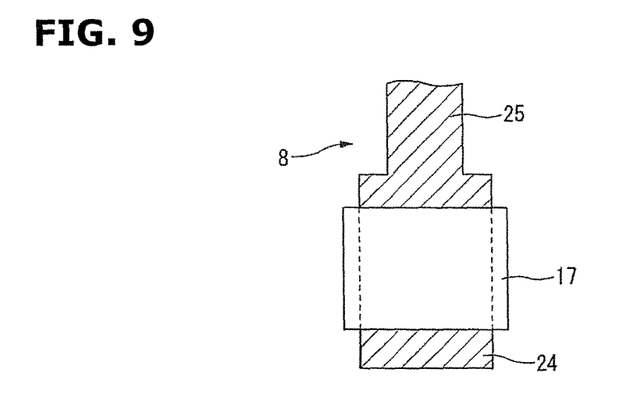
FIG. 9 is an explanatory view schematically showing an upper link other end portion in the comparative example.

Accordingly, when the input load F2 is acted, in the upper link other end portion 24, the shape variation (deformation) of the central portion of the upper link other end portion 24 in the first through hole axial direction is relatively suppressed on the side on which the input load F2 is acted due to the combustion load. That is, it is possible to relieve the bearing end portion contacts at which the both end portions in the first through hole axial direction are contacted on the first link pin 17, relative to a case where the thickness along the first through hole radial direction is constant along the first through hole axial direction (cf. FIG. 9) on the side on which the input load F2 is acted in the upper link other end portion 24. Consequently, it is possible to improve the seizure resistance and the abrasion resistance of the upper link other end side pin hole 26.

In the upper link other end portion 24, the thicknesses of the both end portions in the first through hole axial direction are formed to be smaller in a range in which the necessary strength can be ensured.

Figure 10:
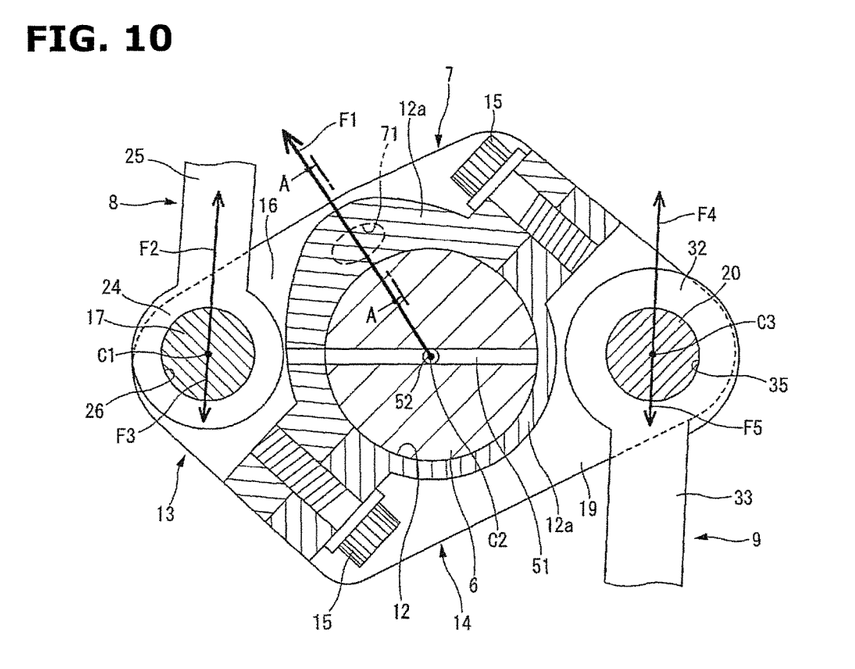
FIG. 10 is an explanatory view schematically showing main parts of a multi-link piston crank mechanism of the internal combustion engine according to one or more embodiments of the present invention.
Figure 11:
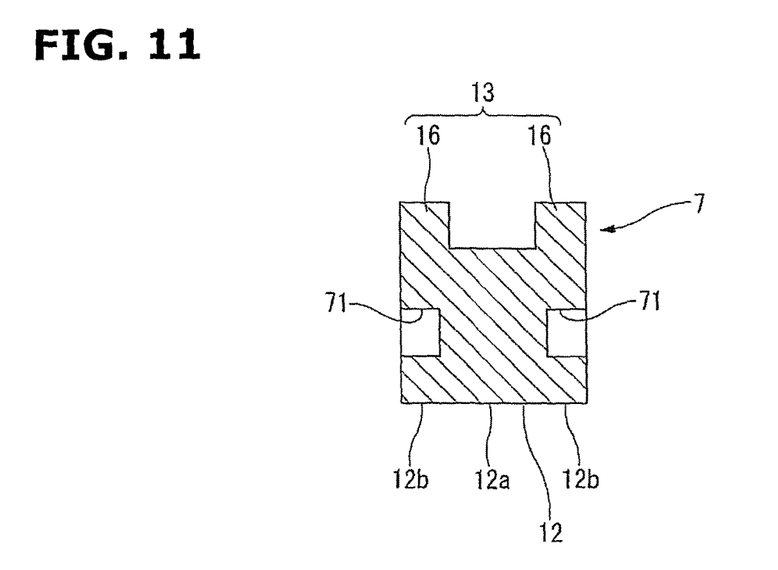
FIG. 11 is a sectional view taken along an A-A line of FIG. 10.

One or more embodiments of the present invention is explained with reference to FIG. 10 and FIG. 11. Here, elements which are similar to those in the above-described embodiments have the same symbols. The repetitive explanations are omitted.

The multi-link piston crank mechanism 4 in this embodiment has the configuration substantially similar to that of the multi-link piston crank mechanism 4 in the above-described embodiments. However, in the central portion 12a of the crank pin bearing portion 12 in the crank shaft axial direction, the thickness (the crank pin radial direction thickness) of the portion which is positioned on the one end side of the lower link 7 along the crank pin radial direction is formed to be relatively larger on the one end side of the lower link 7. This thickness becomes largest at the input position of the input load F1 due to the combustion load. This thickness becomes smaller as it is further apart from the input position of the input load F1 due to the combustion load along the crank pin bearing portion circumference direction.

Moreover, recessed portions 71 are formed on both end surfaces on the one end side of the lower link 7, on the side portion (lateral portion) of the input position of the input load F1 acted to the lower link 7, and on the side portion (lateral portion) of the central portion of the crank pin bearing portion 12 in the crank shaft axial direction.

Thus, it may be possible to attain one or more of the below-described operations and effects, in addition to one or more the operations and the effects in the above-described embodiments.

That is, one or more embodiments of the present invention, the input load F1 due to the combustion load is supported by the portion having the highest rigidity in the portion positioned on the one end side of the lower link 7 of the central portion of the crank pin bearing portion 12 in the crank shaft axial direction.

Accordingly, the crank pin bearing portion 12 can effectively suppress the shape variation (deformation) of the central portion 12a of the crank pin bearing portion 12 in the crank shaft axial direction, at the input position of the input load F1 on the one end side of the lower link 7. That is, the crank pin bearing portion 12 can effectively relieve the bearing end portion contacts by which the both end portions 12b of the crank pin bearing portion 12 in the crank shaft axial direction are contacted on the crank pin 6.

Moreover, the recessed portions 71 are formed on the both end surfaces on the one end side of the lower link 7. With this, in the crank pin bearing portion 12 on the one end side of the lower link 7, it is possible to decrease the rigidities of the both end portions 12b in the crank shaft axial direction.

Therefore, in the crank pin bearing portion 12, the rigidity variation in the crank shaft axial direction becomes small on the one end side of the lower link 7. It is possible to further relieve the bearing end portion contacts in which the both end portions 12b in the crank shaft axial direction are contacted on the crank pin 6. Consequently, it is possible to further improve the seizure resistance and the abrasion resistance of the crank pin bearing portion 12.

In one or more of the above-described embodiments, the multi-link piston crank mechanism 4 is a variable compression ratio mechanism. However, one or more embodiments of the present invention is applicable to the multi-link piston crank mechanism which is not the variable compression ratio mechanism. In this case, for example, the multi-link piston crank mechanism has the configuration substantially identical to that of the multi-link piston crank mechanism 4 in one or more of the above-described embodiments. However, this multi-link piston crank mechanism has a configuration in which the control shaft 41 does not include the eccentric shaft portion 42, and the one end of the control link 9 is rotatably connected to the control shaft 41, in the multi-link piston crank mechanism 4 according to one or more of the above-described embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A multi-link piston crank mechanism for an internal combustion engine, comprising:
   a lower link comprising a crank pin bearing portion rotatably mounted to a crank pin of a crank shaft;
   an upper link comprising a first upper link end portion connected to a piston pin of a piston, and a second upper link end portion connected to a first end side of the lower link through a first link pin inserted into a first through hole of the second upper link end portion; and
   a control link comprising a first control link end portion supported by a cylinder block, and a second control link end portion connected to a second end side of the lower link through a second link pin inserted into a second through hole of the second control link end portion,
   wherein the second end side of the lower link is configured to have an input load due to a combustion load acted thereon, wherein the lower link comprises a first bifurcated end side protruding piece portion and a second bifurcated end side protruding piece portion which are positioned on both sides of the crank pin bearing portion when viewed from an axial direction of the crank shaft, wherein the first bifurcated end side protruding piece portion sandwiches the second upper link end portion, wherein the second bifurcated end side protruding piece portion sandwiches the second control link end portion, wherein the crank pin bearing portion comprises a crank pin bearing central portion disposed at a center thereof in the axial direction of the crank shaft, wherein the crank pin bearing central portion at a portion positioned on the first end side of the lower link is thicker in a radial direction of the crank pin than a portion positioned on the second end side of the lower link, and wherein the second control link end portion is thicker along a radial direction of the second through hole than the second upper link end portion along a radial direction of the first through hole.

2. The multi-link piston crank mechanism as claimed in claim 1, wherein the second control link end portion comprises control link axial direction end portions at both ends thereof in an axial direction of the second through hole, and a control link axial direction central portion at a center thereof in the axial direction of the second through hole, and wherein the control link axial direction end portions are thinner in the radial direction of the second through hole than the control link axial direction central portion on a side on which the input load due to the combustion load is acted.

3. The multi-link piston crank mechanism as claimed in claim 1, wherein the second upper link end portion comprises upper link axial direction end portions at both ends thereof in an axial direction of the first through hole, and an upper link axial direction central portion at a center thereof in the axial direction of the first through hole, and wherein the upper link axial direction end portions are thinner in the radial direction of the second through hole than the upper link axial direction central portion, on a side on which the input load due to the combustion load is acted.

4. The multi-link piston crank mechanism as claimed in claim 1, wherein the crank pin bearing portion comprises an oil hole that is formed on the first end side of the lower link, that is formed in the crank pin bearing central portion in the crank shaft axial direction, and that is arranged to supply a lubricant oil from the crank pin side to the second upper link end portion.

5. The multi-link piston crank mechanism as claimed in claim 4, wherein the oil hole is formed at a position out of an input position of the input load due to the combustion load acted to the lower link.

6. The multi-link piston crank mechanism as claimed in claim 4, wherein centers of the first link pin, the crank pin, and the second link pin are aligned on a straight line when viewed from the axial direction of the crank shaft, and wherein the oil hole is formed on the line.

7. The multi-link piston crank mechanism as claimed in claim 1, wherein the lower link comprises a thick portion located on the first end side of the lower link in the crank pin bearing central portion in the axial direction of the crank shaft, wherein the thick portion is thicker along the radial direction of the crank pin than a remainder of the crank pin bearing portion wherein the thick portion is disposed at the input position of the input load due to the combustion load, and wherein the crank pin bearing central portion becomes thinner in the radial direction of the crank pin farther from the thick portion along a circumference direction of the crank pin bearing portion.

8. The multi-link piston crank mechanism as claimed in claim 7, wherein the first end side of the lower link comprises recessed portions formed on lower link axial direction end surfaces thereof in the axial direction of the crank shaft, wherein the recessed portions are positioned on side portions of the input position of the input load due to the combustion load acted to the lower link, and on side portions of the crank pin bearing central portion.

* * * * *